United States Patent [19]
Meise, Jr. et al.

[11] 3,969,589
[45] July 13, 1976

[54] TELEPHONE SWITCHING SYSTEM HAVING ATTENDANT QUEUING FACILITIES

[75] Inventors: Henry August Meise, Jr., Boulder; George William Taylor, Broomfield, both of Colo.

[73] Assignee: Bell Telephone Laboratories, Incorporated, Murray Hill, N.J.

[22] Filed: Aug. 22, 1975

[21] Appl. No.: 606,837

[52] U.S. Cl. .............................................. 179/27 D
[51] Int. Cl.² ........................................ H04Q 3/64
[58] Field of Search ................................. 179/27 D

[56] References Cited
UNITED STATES PATENTS

| | | |
|---|---|---|
| 3,702,380 | 11/1972 | Gueldenpfennig................ 179/27 D |
| 3,721,770 | 3/1973 | Beidel et al........................ 179/27 D |
| 3,789,153 | 1/1974 | Malm................................. 179/27 D |

*Primary Examiner*—William C. Cooper
*Attorney, Agent, or Firm*—David H. Tannenbaum

[57] ABSTRACT

A PBX switching system is described in which a queue is used to provide sequential serving of attendant directed calls. This is accomplished by sequentially storing the identity of the calling circuit for each newly arrived attendant directed call in an attendant queue. When an attendant position becomes available, the calling circuit identity stored longest in the queue is used to directly select the associated calling circuit and to connect this circuit to the attendant.

16 Claims, 12 Drawing Figures

TELEPHONE SWITCHING SYSTEM HAVING ATTENDANT QUEUING FACILITIES

BACKGROUND OF THE INVENTION

This invention relates to a telephone system and, in particular, to a private branch exchange (PBX) system which enables attendant directed calls to be handled in an ordered manner on a first-come, first-served basis.

DESCRIPTION OF THE PRIOR ART

In PBX systems it is obviously desirable to provide facilities whereby attendant directed calls are handled in an ordered, equitable manner. The most desirable arrangement is to serve these calls in a first-come, first-served manner. Some existing telephone switching systems provide this feature. For example, U.S. Pat. No. 3,702,380 issued to Klaus Gueldenpfenning on Nov. 7, 1972 teaches (1) identifying the trunk circuit requesting connection to the attendant (2) sequentially storing the calling trunk identity in a first-in first-out queue; (3) determining when an attendant position becomes available; (4) sequentially scanning trunk circuits waiting for connection to an attendant; and (5) reidentifying each trunk circuit scanned in an attempt to determine if this call is next to be served.

In Gueldenpfenning this is accomplished by comparing each scanned trunk circuit identity with the circuit identity stored longest in the queue. If a correspondence does not exist, this reidentification procedure continues trunk by trunk until a correspondence is obtained between the scanned trunk circuit identity and the identity stored longest in the queue. The trunk circuit so located is the trunk circuit waiting the longest for connection to an idle attendant position. The switching system then responds to this determination by implementing a connection between the trunk circuit and the idle attendant position circuit.

The disadvantage of this arrangement is that extensive call processing time is required to locate the specific trunk circuit to be connected to the attendant position circuit. The trial and error algorithm used requires a multitude of identification and comparison operations to locate the trunk. This requires not only extensive call processing time but also requires extensive identification, comparison, and decision-making circuitry.

It is obviously desirable to utilize a more direct method of locating the specific trunk circuit. It is also desirable to make more efficient use of the trunk circuit identity stored longest in the queue. The trunk circuit identity is already known and stored in the queue. Therefore, it is advantageous to use this trunk circuit identity to select the trunk circuit directly. This direct selection eliminates the multitude of identification and comparison operations required by the prior art arrangement.

In view of the foregoing, an object of this invention is to provide attendant queuing facilities which are of less complexity and cost than prior art arrangements.

It is a further object to provide attendant queuing facilities that handle attendant directed calls on a first-come first-served basis.

It is a further object to provide attendant queuing facilities that exclusively utilize the trunk identity stored longest in the queue to directly select the trunk circuit to be connected to the attendant.

SUMMARY OF THE INVENTION

In accordance with out invention, we provide facilities in a PBX system which permits calls directed to the attendant to be handled in a first-come, first-served manner.

In accordance with our invention the identity of each trunk requesting connection to the attendant is sequentially stored in the attendant queue. The identity stored first in the queue is, therefore, that of the call waiting the longest. When an attendant position becomes available, the identity stored first in the attendant queue is then used to jam-set the trunk selector, thereby immediately selecting the circuit involved in this call. This circuit is then connected to the attendant via the network without further decision-making or comparison operations.

Once the connection to the attendant has been implemented, the data stored in the queue is updated in that the identity of the call just completed is expunged from the queue. All the other identities of calls waiting in the queue are then shifted in position such that the next longest waiting call now has its identity stored first in the queue.

Accordingly, it is a feature of the invention to provide circuitry for storing the identity of attendant directed calls in a first-in first-out manner such that this data eliminates the need for extensive call processing operations to relocate an attendant-directed call for connection to an attendant.

A further feature of the invention is to provide circuitry for utilizing each stored circuit identity as the address of the circuit requesting connection to the attendant such that this data can be used to immediately select the trunk circuit.

BRIEF DESCRIPTION OF THE DRAWING

The operation and utilization of the present invention will be more fully apparent from the following description of the drawing in which:

FIG. 12 shows the manner in which FIGS. 2–5 should be arranged.

GENERAL DESCRIPTION - FIG. 1

Figure 1:
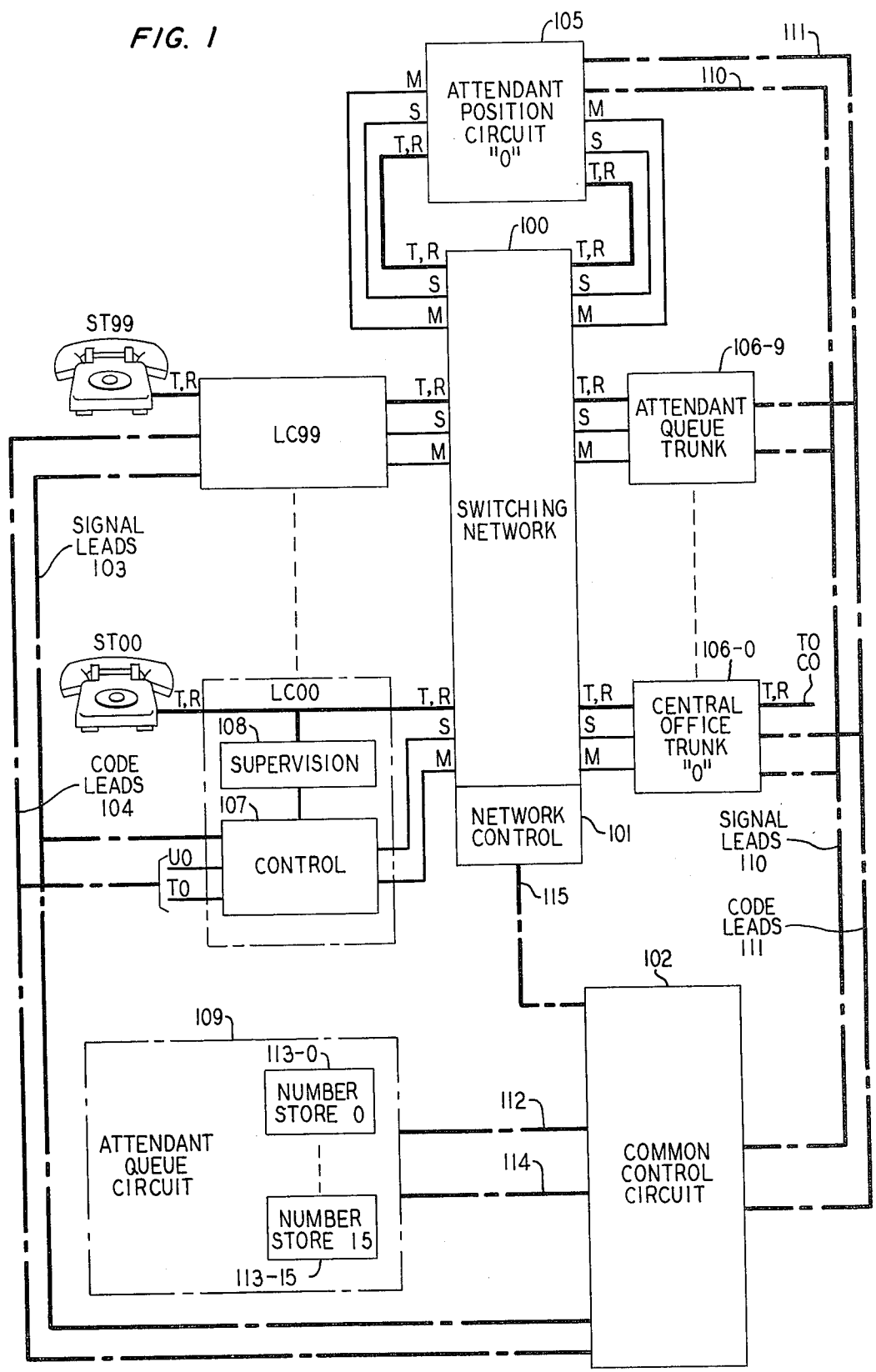
FIG. 1 illustrates one embodiment of the invention in block diagram form.

FIG. 1 shows the broader system aspects of our invention as embodied in a wired logic electronic type PBX of the type disclosed in detail in the H. H. Abbott et al U.S. Pat. No. 3,377,432 issued Apr. 9, 1968. The Abbott et al specification is hereby incorporated as a part of the present specification to the same extent as if fully set forth herein.

The system comprising our invention includes an end marked network which is designated as element 100 on FIG. 1. It further includes a plurality of PBX stations, ST00 through ST99, each of which is connected to one of line circuits LC00 through LC99. Each line circuit is connected to the switching network 100 and is additionally connected by means of various conductors to the common control circuit 102 on FIG. 1. These conductors include a set of signal leads 103 and a set of code leads 104. As subsequently described, the code leads, together with signal leads 103, enable the common control circuit to scan, identify, and select any line ciircuit as well as to receive signals from the line circuits indicating their current conductive states.

The disclosed embodiment also includes a plurality of attendant position circuits, such as attendant position circuit 105, and a plurality of trunk circuits such as trunk circuits 106-0 through 106-9. The line circuits are connected to the left side (the line side) of the network; the trunk circuits are connected to the right side (the trunk side) of the network. Each attendant position circuit 105 has both a line side and a trunk side appearance in order that it may be connected by the network to either a trunk circuit or a line circuit. The switching network is of the end marked type and in response to the presence of the marking potential on either side thereof, it establishes, independently of the remainder of the system, a network interconnection between the circuits associated with the marked terminals.

The disclosed system is of the common control type, in which the common control circuit 102 governs the order in which various circuits are interconnected by the network during the serving of each call. The common control circuit receives call service requests from the line circuits, from the attendant position circuits, and from the trunk circuits. Upon receipt of each request, the common control circuit regulates the operation of the requesting circuit and controls the establishment of a network connection between the requesting circuit and any circuit of the system with which the requesting circuit may be connected. This operation is more fully described in Abbott et al patent. The serving of a call may require a plurality of network connections to be established sequentially.

Line Circuits

Each line circuit includes a control logic element 107 which has a plurality of transistor gates which are selectively controlled to assume either an ON or an OFF conductive state. A gate is said to be ON whenever it receives energizing potentials at all of its inputs and said to be OFF when energizing potentials are not applied to all of its inputs. The conductive state of the line circuit gates is jointly controlled by the supervision circuit 108 within each circuit, by the code leads 104, and by the signal leads 103.

Signals indicating the conductive states of the line circuit gates are transmitted over signal leads 103 to the common control circuit. These signals enable the common control circuit to monitor the state of the line circuits and, by means of prewired logic, to determine whether a line circuit requires action by the common control circuit with regard to either a call initiated by or directed to the line circuit. Included among the functions performed by the common control circuit in connection with the establishment of calls are the recognition of service requests from a calling line circuit when it initially goes off-hook, the identification of the calling line circuit so that it may be connected to a register, the selection of a called line circuit following the reception of dialed digits by the register, the selection of a trunk circuit for interconnecting the called and calling stations, and the reidentification of a calling line circuit at the time it is to be connected to the selected trunk circuit and, in turn, to the called line circuit.

Attendant Queue

The disclosed embodiment also includes an attendant queue circuit 109 which is used to store the identity of circuits requesting connection to the attendant.

The operation of the system of FIG. 1 for the serving of calls not utilizing the attendant queue service is fully described in detail in the Abbott et al patent. Therefore, in the following description we will only briefly mention how such calls are served.

The attendant queue service is utilized only when a call is directed to the attendant. This call may either be from a station requesting connection to the attendant or an incoming central office call directed to the attendant or an existing central office trunk call requesting attendant recall. In the case of a station requesting connection to the attendant, the station is connected first to an attendant queue trunk 106-9. This is to provide uniformity of operation in all the calls directed to the attendant in that in each and every case it is the trunk circuit involved in the call that initiates the request for a connection to the attendant.

Attendant Directed Call Placed in the Queue

For simplicity of description, we will describe only one type of call directed to the attendant and this will be attendant recall on an existing trunk call. It will be initially assumed that station ST00 originates an outgoing central office trunk call. This is done by station ST00 going off-hook which causes the common control circuit to establish a direct network connection between station ST00 and a digit register circuit. Station ST00 now hears dial tone from the digit register circuit and dials the central office trunk access code which is detected by the digit register circuit. The digit register now signals the common control circuit that station ST00 is requesting connection to a central office trunk circuit and the common control circuit establishes a direct network connection between station ST00 and an idle central office trunk circuit. The telephone user at station ST00 hears central office dial tone via the central office trunk circuit and now completes the outgoing central office trunk call.

It will be assumed that station ST00 now wishes to recall the attendant. The user at station ST00 initiates the attendant recall operation by flashing the station switchhook. The switchhook flash from the subset is detected by the central office trunk circuit which places a signal on the signal leads 110 to the common control circuit to request the common control circuit to connect this call to the attendant by way of an attendant position circuit. The common control circuit responds to this request by identifying the trunk circuit that is requesting connection to the attendant and the common control circuit places signals on signal leads 112 to activate the attendant queue circuit 109.

The attendant queue circuit activates one of the idle attendant queue number stores 113-0 through 113-15. The common control circuit then reads out the identity of the trunk requesting connection to the attendant to the selected idle number store of the attendant queue circuit via data bus leads 114. Thus, the identity of the trunk requesting connection to the attendant is stored in the attendant queue circuit and the common control circuit, by way of signal leads 110, causes the central office trunk circuit to remove its attendant connection request from signal leads 110.

The attendant queue circuit contains a plurality of number stores, each of which is used to store the identity of a trunk circuit requesting connection to the attendant. These requests are served on a first-in, first-out basis as soon as an attendant becomes available to handle such a call. This ordered handling of attendant connection requests is achieved by storing the identity of the first requesting circuit in store 113-0 and subsequent requests are stored in succeeding number stores. Thus, the age of the request is determined by its position in the succession of number stores.

Call Completion - Attendant Queue Readout

As long as there are one or more numbers stored in the number stores of the attendant queue circuit, the attendant queue circuit attempts to complete these calls by placing a readout request on leads 112 to the common control circuit. The common control circuit will service this request as soon as an attendant becomes available to handle the call. Let it be assumed that the trunk that is involved in the call being discussed has its identity stored in the first number store (113-0) of the attendant queue circuit. Let it also be assumed that an attendant has just become available to handle a call.

The combination of the idle attendant and the attendant connect service request from the attendant queue circuit on leads 112 causes the common control circuit to be activated. The common control circuit places signals on code leads 111 to select an idle attendant position circuit which will give access to the idle attendant. Let it be assumed that the attendant position circuit selected is attendant position circuit 0 which is circuit 105. The common control circuit places signals on signal leads 112 to the attendant queue circuit to cause the attendant queue circuit to read out the contents of the first number store (113-0) onto the data bus leads 114 to the common control circuit 102. Thus, the identity of the trunk requesting connection to the attendant is now stored in the common control circuit.

The common control circuit responds to this data by placing a unique combination of signals corresponding to this trunk identity on the code leads 111. This unique combination of signals on the code leads serves to select or activate the trunk of interest. By means of a callback operation as described in the Abbott et al patent; the common control circuit identifies the line circuit that is currently connected to the selected trunk, in this case line circuit LC00, which is requesting connection to the attendant. The common control circuit initiates the callback operation by applying signals on the signal leads 110 to the selected trunk circuit causing the trunk circuit to apply a LOW signal to its conductor S of the trunk side network appearance. This LOW signal is extended through the network on conductor S to the line side network appearance of line circuit LC00.

The common control circuit initiates a line scanning operation to identify the called back line circuit. The gate of line circuit LC00 turns off when this line circuit is scanned by signals on conductors 103 because there is a LOW signal on its S lead. The turn-off of the line circuit gate places a signal on the code leads 104 to the common control circuit which stops the scanning operation.

Call Completion - Connection to the Attendant Position Circuit

By means of signal leads 110 the common control circuit causes the selected idle attendant position circuit to mark its trunk side network appearance by placing a LOW signal on its conductor M associated with that trunk side network appearance. The common control circuit, by means of signal leads 103, also causes line circuit LC00 to mark its line side network appearance by placing a LOW signal on the conductor M associated with its line side network appearance.

The incidence of a marked appearance on both the line side and the trunk side of the switching network activates the network control 101 which determines that there exists a path between both marked network appearances. In response to this determination, the network control places a signal on one of the conductors 115 to the common control circuit indicating the existence of a path between the two marked network appearances.

The common control circuit responds to this information by placing a signal on one of the signal leads 110 to the trunk circuit causing the trunk circuit to drop the network connection between itself and line circuit LCOO. The common control circuit next places a signal on one of conductors 115 causing the network control to establish a network connection between the two marked network appearances, that is, line circuit LCOO and the trunk side network appearance of attendant position circuit O. The completion of this network path causes the network control to place a signal on one of the conductors 115 to the common control circuit indicating that the path has been completed.

This information causes the common control circuit, by way of signal leads 110, to cause the selected idle attendant position circuit to mark its line side network appearance by placing a LOW signal on the conductor M associated with that network appearance. The common control circuit also, by way of signal leads 110, causes the selected central office trunk circuit to mark its trunk side network appearance by placing a LOW signal on the conductor M associated with its trunk side network appearance. Once again, the incidence of a marked network appearance on both the line side and the trunk side of the network activates the network control portion of the switching network and causes it to determine that there exists a network path between the two marked network appearances. This information is relayed to the common control circuit by way of one of the conductors 115 and causes the common control circuit to respond by placing a signal on one of the conductors 115 to cause the network control to establish a network connection between the two marked network appearances. When the connection is established, the common control circuit removes the selection from the central office trunk circuit, the attendant position circuit, and line circuit LCOO.

The present status of the call is that line circuit LCOO is connected to the trunk side network appearance of attendant position circuit O while the line side appearance of attendant position circuit O is connected to the central office trunk O. Thus, both station party STOO and the central office party are connected to the attendant through the attendant position circuit O associated with that attendant.

The common control circuit now places a signal on one of the conductors 112 to the attendant queue circuit and causes the attendant queue circuit to advance its number stores. This is done by clearing the contents of number store 113-0 and transferring the contents of the subsequent store 113-1 into number store 113-0. This transfer of contents is done simultaneously in all stores 113-0 through 113-15 so that each number stored in the queue is advanced to the next number store. The completion of this transfer is indicated to the common control circuit by the attendant queue circuit placing a signal on one of the conductors 112 causing the common control circuit to go idle thus completing this call sequence.

DETAILED DESCRIPTION

Sequence Circuits - FIGS. 6 through 9

Figure 8:
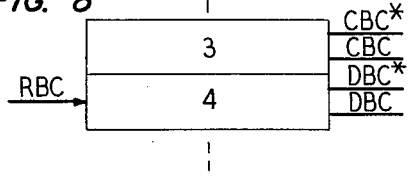
Figure 9:
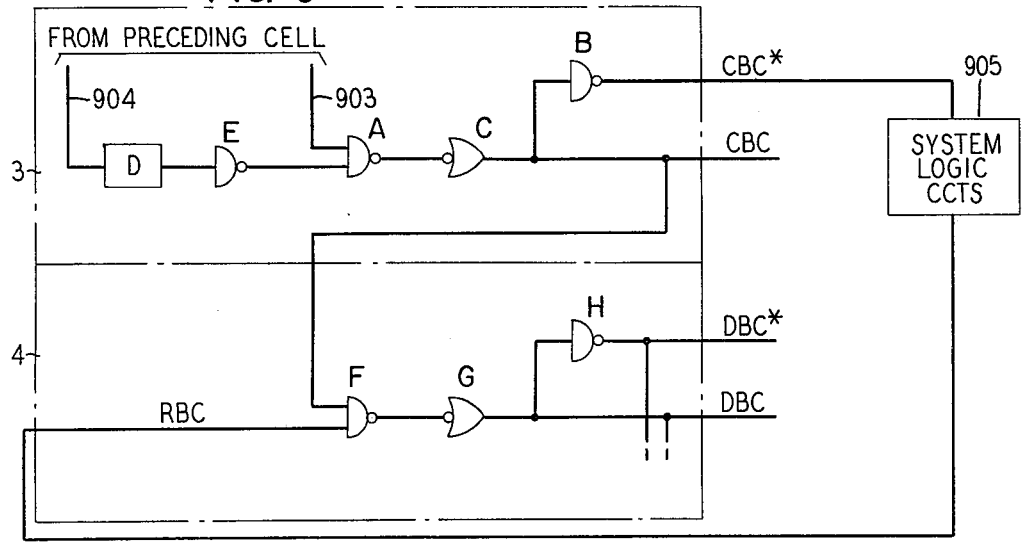
Figure 10:
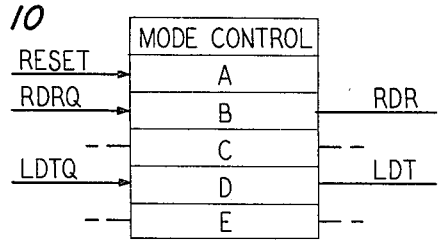
FIGS. 10–11 show a mode control circuit typical of the one used in the embodiment of the invention.
Figure 11:
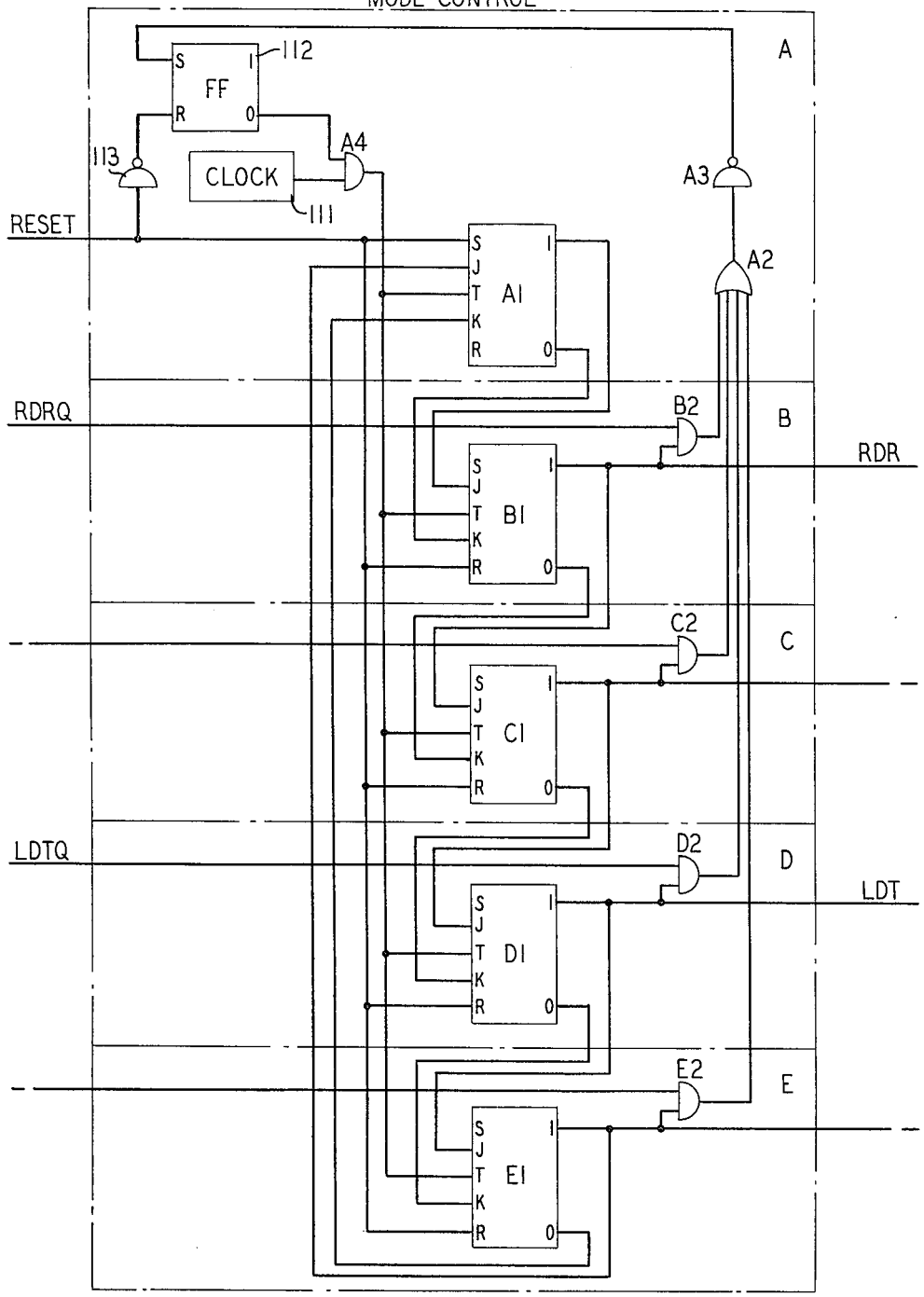

Before embarking on a detailed discussion of the operation of our invention it would be helpful to review the sequence circuits shown in FIGS. 6 through 9 and the mode control circuit shown in FIGS. 10 and 11. In particular, the common control portion of the system contains a plurality of sequence circuits whose function is to apply signals or control potentials to various portions and circuit elements of the system in a predetermined sequence. The complexity of the drawing has been reduced by representing the sequence circuits with symbols indicating their logical function, rather than by disclosing circuit details everywhere a sequence circuit appears on the drawing.

Figure 6:
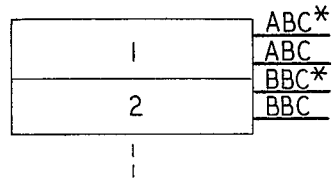
FIGS. 6–9 show sequence circuits typical of the ones used in the embodiment of the invention.

We use two types of sequence circuits in our system. The type shown in FIG. 6 has a plurality of stages or elements of which two are shown and designated 1 and 2. This type of sequence circuit, once it is activated, automatically steps from element to element without any response from the system. The circuit details of the sequence circuit of FIG. 6 are shown on FIG. 7. The sequence circuit of FIG. 8 is similar to that of FIG. 6, except that it does not step from element 3 to element 4 until it receives a system response on conductor RBC. FIG. 9 illustrates the circuit details of the circuit of FIG. 8.

Figure 7:
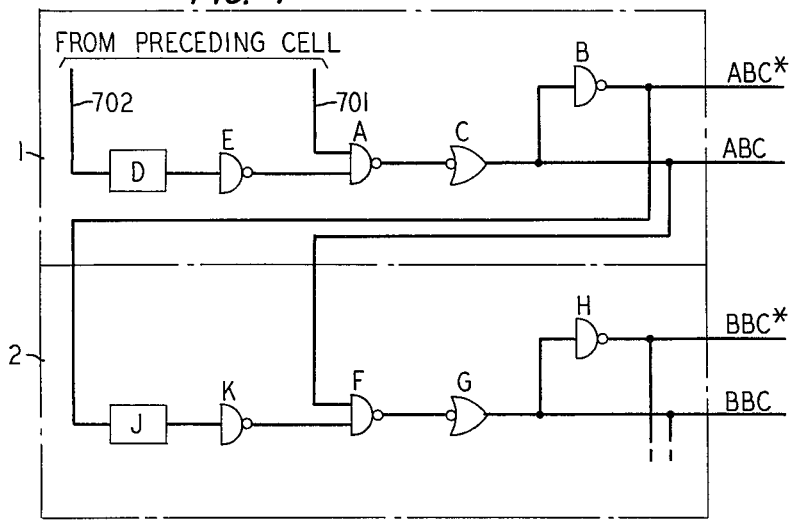

The following describes the operation of the sequence circuits of FIG. 7. Stage 1 is enabled when both inputs of gate A go HIGH. The upper input of gate A is driven HIGH by a potential applied to conductor 701 from the preceding stage. A LOW on conductor 702 from the preceding stage is propagated, after a predetermined delay, through delay element D, applied to the input of inverting OR gate E, and applied as a HIGH to the lower input of gate A.

Gate A turns ON and drives its output LOW when both of its inputs go HIGH. The LOW on its output turns OFF gate C and drives conductor ABC HIGH. The HIGH from gate C turns ON gate B and drives conductor ABC* LOW. The potentials on conductors ABC and ABC* are applied to other elements of the system to control those elements in the performance of their assigned system functions. The potentials of these two conductors also extend to stage 2 of the sequence circuit to activate it in a manner analogous to that already described for stage 1. Specifically, the upper input of gate F is HIGH at this time from conductor ABC. The lower input of gate F is driven HIGH, after a predetermined delay, in response to the LOW on conductor ABC*. The purpose for the delay is so that the outputs from thee first and second stages of the sequence circuit will have a predetermined sequence in time. When gate F turns ON after the predetermined delay, gate G turns OFF and drives conductor BBC HIGH and drives conductor BBC* LOW from gate H. This delay insures that conductors ABC and ABC* assume their active state and then, after a predetermined time, conductors BBC and BBC* will assume their active state as gates G and H respond to the turn-ON of gate F when both of its inputs go HIGH.

Conductors BBC and BBC* extend both to the next stage of the sequence circuit as well as to other elements of the system to control them in the performance of their system functions. The next stage of the sequence circuit is activated by the potentials on conductors BBC and BBC* in a manner analogous to that already described for elements 1 and 2.

The sequence circuits of FIGS. 6 and 7, as well as those of 8 and 9, operate in such a manner that the output conductors of an activated stage remain enabled with a HIGH or a LOW potential, as the case may be, when the sequence circuit steps to the next position to activate it. In other words, after the output conductors of a stage are enabled, they remain enabled when the sequence circuit steps through the remainder of its positions. The output conductors of each stage are disabled or reset to their normal state only when the enable potentials are removed from the control gate of the first stage; namely, the gate that corresponds to gate A of stage 1. The turn-OFF of that gate disables the outputs of all other stages of the sequence circuit.

The following describes the operation of the sequence circuit of FIGS. 8 and 9. Stage 3 operates in the same manner as described for stages 1 and 2 of FIG. 7. Namely, both inputs of gate A to HIGH; its output goes LOW; the output of gate C goes HIGH to conductor CBC; and the output of gate B goes LOW to conductor CBC*.

The output of gates B and C are connected to element 905 which is entitled "System Logic Circuits". The output of gate C also extends to the upper input of gate F. Element 905 receives the control potentials on conductor CBC*, performs its assigned system function, and then transmits a signal over conductor RBC to the lower input of gate F. The receipt of this signal indicates that the system function assigned to element 906 has been completed and that the sequence circuit may now step from position 3 to position 4. The simultaneous application of signals to the lower and upper inputs of gate F turns the gate ON, turns gate G OFF, and gate H ON. This drives conductors DBC HIGH and DBC* LOW in a manner similar to that already described.

The connections from stage 4 to the next stage depend upon whether the next stage must wait for a system response before it assumes its active state. If it is desired that the stepping action be automatic after a predetermined time delay, the next stage will be of the type shown for stages 1, 2, and 3, and conductors DBC and DBC* will supply its controlling potentials. On the other hand, if the next stage must wait for a system response before it becomes active, it will be of the type shown for stage 4. In this case, only one of its control potentials will be supplied by conductor DBC. Its other input will come from a system logic circuit over a conductor analogous to conductor RBC for element 4.

Each position of the sequence circuit of 9 that becomes active holds its output conductors enabled as the succeeding stages become active. All output conductors, once they are enabled, remain enabled until the entire sequence circuit is reset when an enable potential is removed from one of the inputs of the AND gate corresponding to AND gate A for element 3 provided that any external input signal to the position and all prior positions remain applied. The removal of an external signal turns OFF the controlling AND gate for the stage to which it is connected as well as to all subsequent stages.

Mode Control - FIGS. 10 and 11

Figure 3:
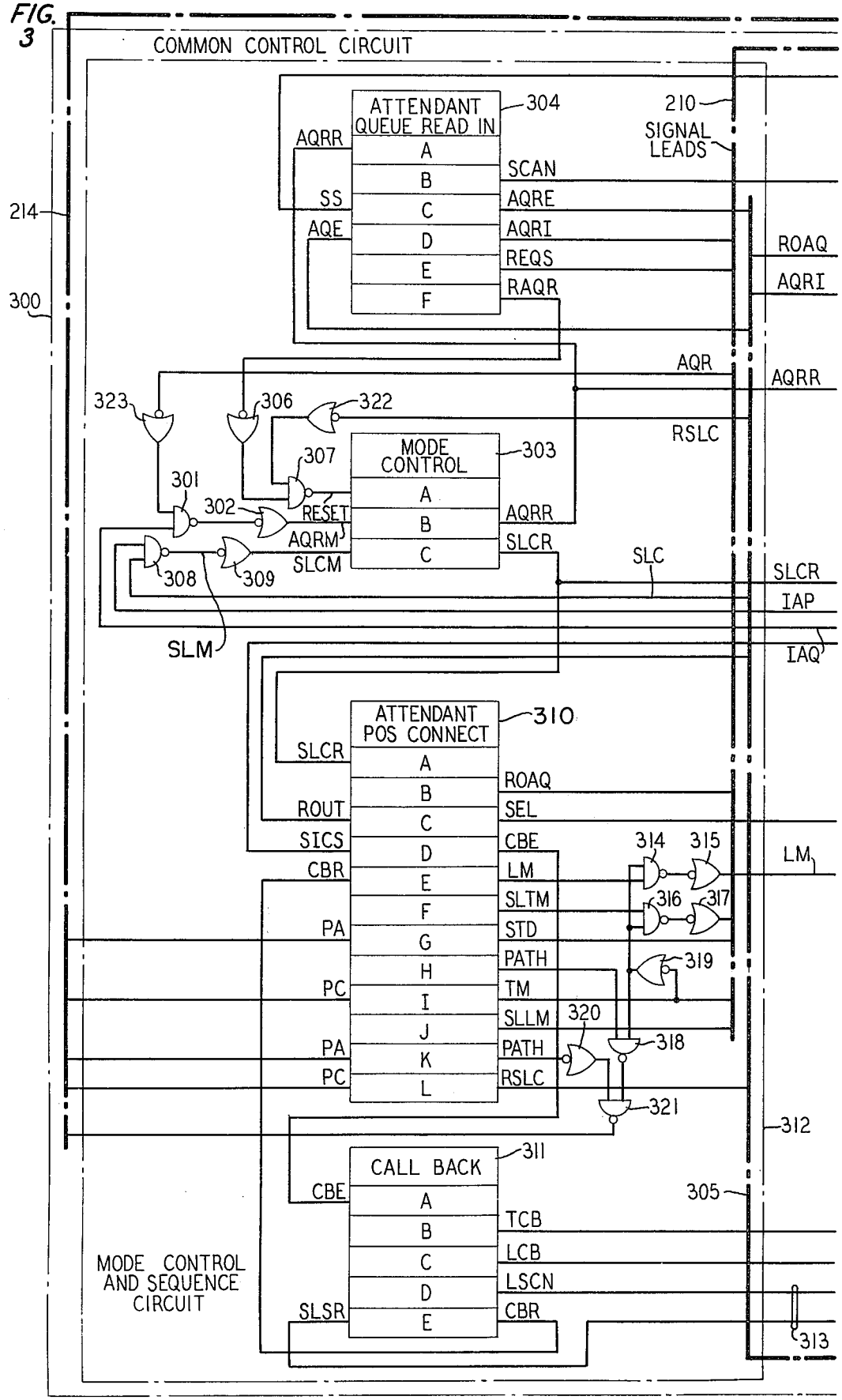
Figure 4:
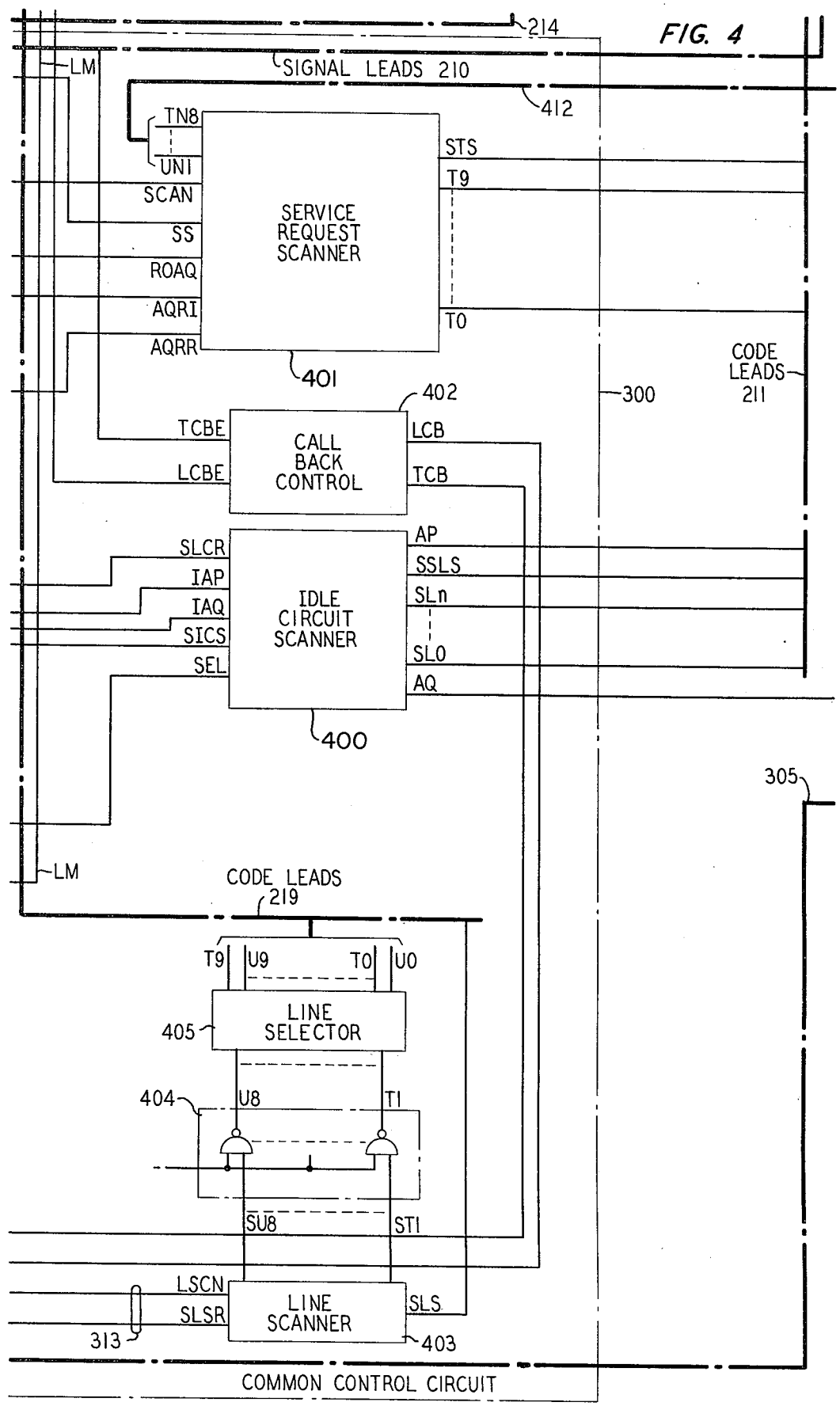
Figure 5:
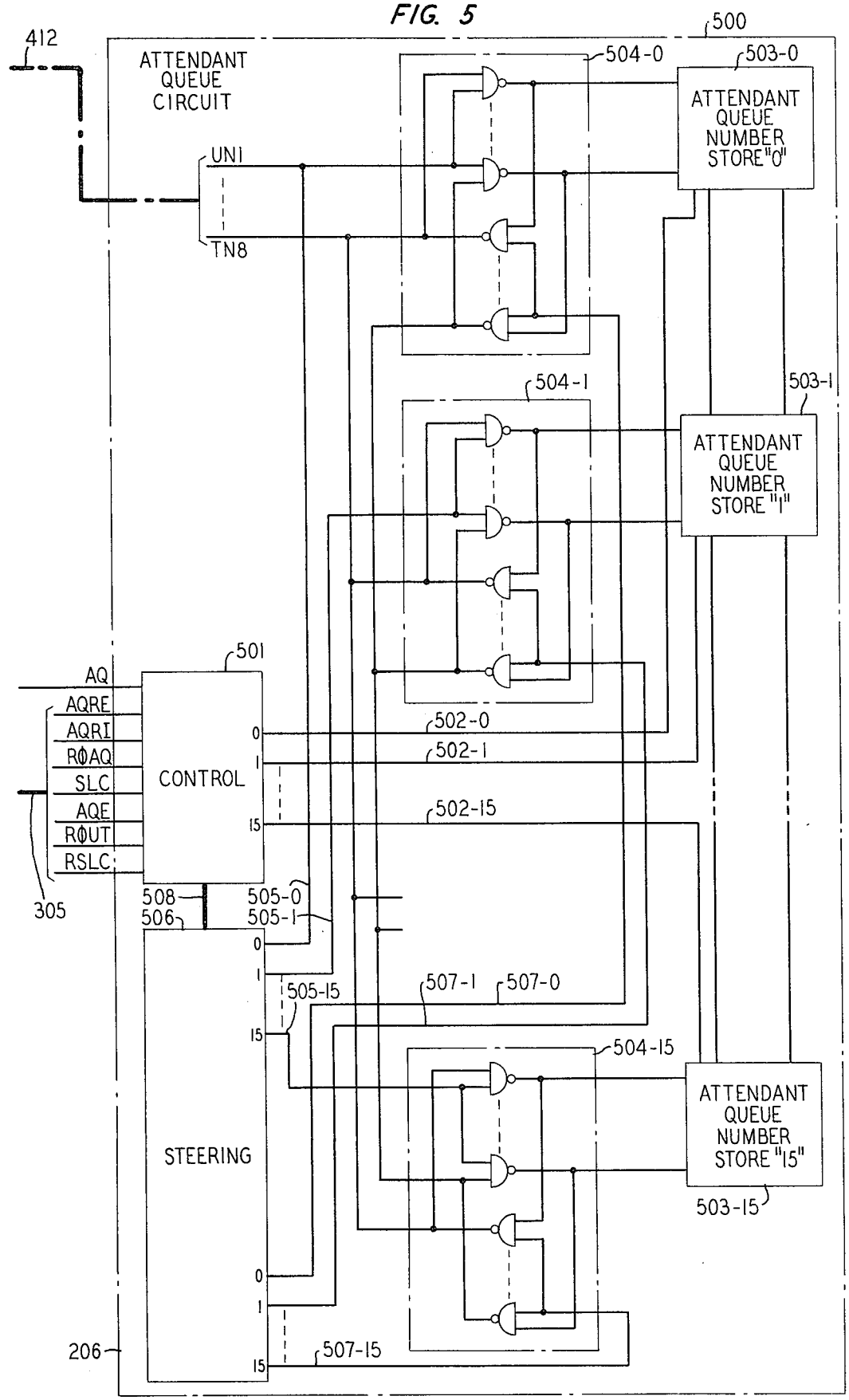

The mode control circuit, which is shown as element 301 on FIG. 3, is shown in further detail on FIGS. 10 and 11. FIG. 10 shows the mode control as having five sections designated A through E. Input conductors enter the left side of each section; output conductors extend from the right side, sections B, C, D, and E. The mode control of FIG. 11 is also subdivided into operational elements A through E; it further has input and output conductors that correspond to those of FIG. 10.

The mode control circuit of FIG. 11 uses JK flip-flops in a ring counter configuration. The clock 111 is connected via gate A4 to the T input of each flip-flop. At certain times, as subsequently described, the clock output pulses are effective to advance the operational state of the counter from stage-to-stage one step at a time.

Each JK flip-flop has inputs designated S, J, T, K and R; each JK flip-flop also has outputs designated 1 and 0. A HIGH on the R input resets a flip-flop. This causes its 0 output to be HIGH and its 1 output to be LOW. Conversely, a HIGH on the S input sets a flip-flop so that its 1 output is HIGH and its 0 output is LOW. The J input is functionally associated with the S input and the K input is associated with the R input. The J and K inputs differ from the S and R inputs in that a high input signal to either the J or K input is not effective to alter the state of the flip-flop unless the signal is received coincidentally with a clock pulse on the T input.

The J and K inputs of each flip-flop are connected to the 1 and 0 outputs, respectively, of the previous stage. Depending upon the conductive state of each flip-flop, one of its outputs is HIGH while the other is LOW. When a clock pulse is received on the T input of a flip-flop, it is set to the state of the previous stage under control of the signals applied to its J and K inputs. If the J input is HIGH, the flip-flop is set; if the K input is HIGH, the flip-flop is reset. JK flip-flops are well known in the art and, therefore, no further description of their operation is necessary.

The initial or rest condition of the mode control circuit of FIG. 11 occurs when a reset pulse is applied to the RESET conductor and, in turn, to the S input of flip-flop A1. The RESET conductor also extends to the input of gate 113 as well as to the R input of flip-flops B1, C1, D1, and E1. The reset signal is a HIGH and its application to the RESET conductor sets flip-flop A1 and resets any of flip-flops B1, C1, D1, or E1 that may have previously been in a set state. By means of gate 113, the reset signal also resets flip-flop 112. Subsequently, after the reset signal terminates, the clock pulses pass through gate A4 and advance the JK flip-flop counter chain step-by-step in response to the reception of each clock pulse. Thus, following the setting of flip-flop A1, the next clock pulse sets flip-flop B1 and resets flip-flop A1. The counter chain advances in this manner one step for each clock pulse received until a mode control request signal is received.

When a request is received for a particular mode such as, for example, mode B, the request signal on conductor RDRQ enables or primes the upper input of gate B2. Subsequently, when the counter advances to its position in which the B1 flip-flop is set, the 1 output of the flip-flop enables the lower input of gate B2. This turns the gate on and makes its output HIGH. This HIGH extends to an input of gate A2 which makes its output HIGH. This HIGH is inverted by gate A3 to a LOW. This LOW is extended to the set input of flip-flop 112 to switch it to a set state. The LOW on the 0 output of flip-flop 112 inhibits the upper input of gate A4 so that the clock pulses no longer pass through the gate to the JK flip-flops.

Flip-flop B1 remain set and its 1 output applies a HIGH to the RDR output conductor of element B. The mode control circuit remains in this state until a HIGH is subsequently received on the RESET conductor from one of the sequence circuits shown on FIG. 3. At this time, the reset signal sets the A1 flip-flop, resets flip-flop B1, and resets flip-flop 112. When the reset pulse terminates, the clock pulses are again applied to the JK flip-flops as described so that the circuit advances one step for each pulse until a subsequent service request signal is received. Because of the order in which the ring counter steps through its sequence, the stages have a preference. In the case of simultaneous mode requests the highest preference mode is selected. After the mode control is again reset, the highest preference remaining mode request is served so that eventually all waiting mode requests are served.

Overall System Operation - FIGS. 2, 3, 4, 5

Drawing FIGS. 2–5 when arranged with respect to each other as shown in FIG. 12 illustrate how the various elements of our inventive embodiment cooperate to provide attendant queuing features. The various equipments, such as line circuit, trunk circuits, the common control circuit, etc., are oriented with respect to each other on FIG. 2–5 in a manner analogous to that of FIG. 1.

Figure 2:
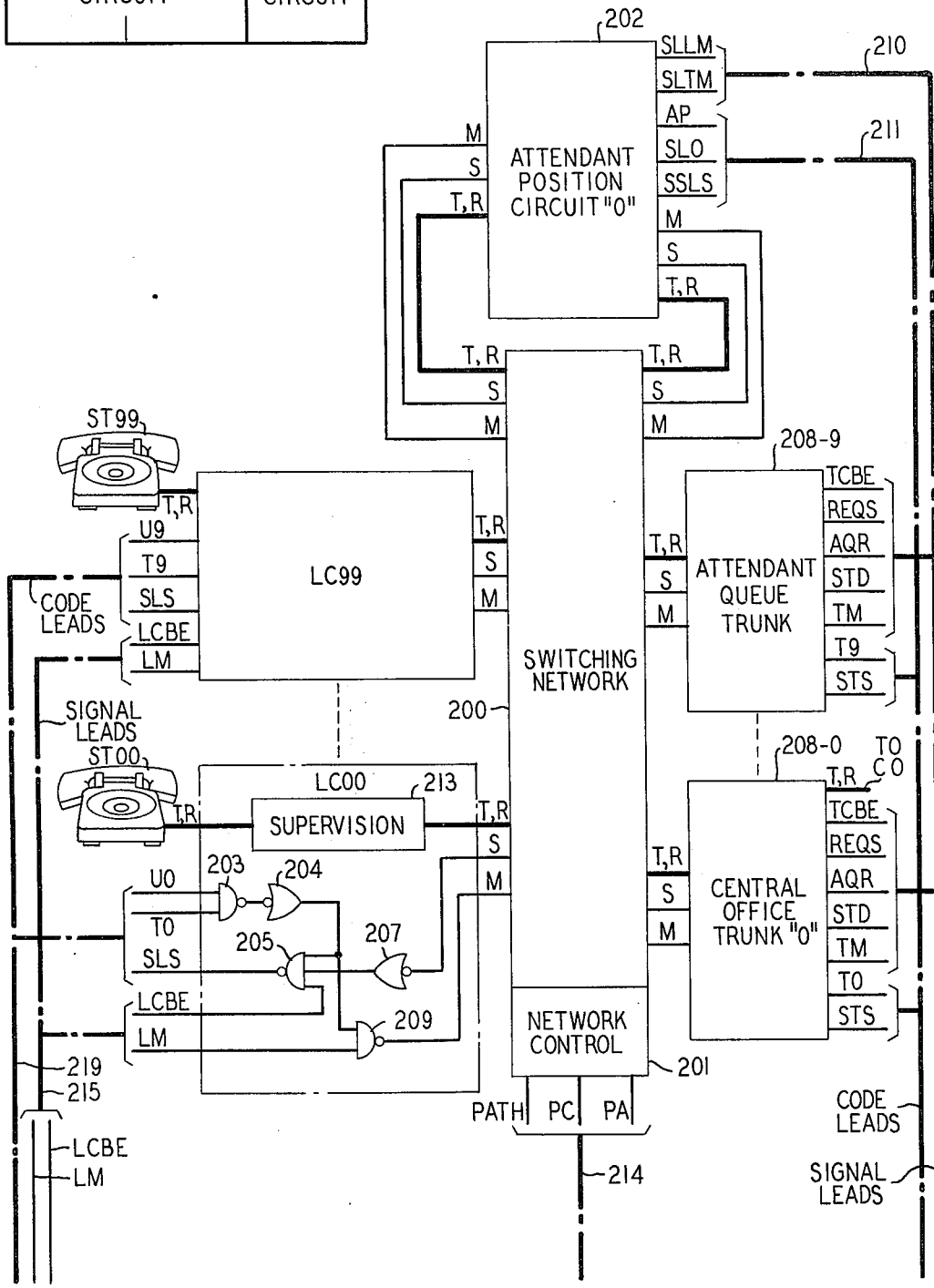
FIGS. 2–5 are a detailed circuit diagram of a preferred embodiment of the invention.

The description of FIG. 2–5 is made with reference to the same call conditions assumed for FIG. 1; namely, station STOO FIG. 2 is connected to a central office trunk call and station STOO wishes to recall the attendant utilizing the attendant queue arrangement. It is also assumed that station STOO is being served by central office trunk circuit 208-O FIG. 2.

Telephone User Initiates Attendant Recall-Trunk Identity Stored in Queue

The user at station STOO initiates the attendant recall operation by flashing the switchhook. The switchhook flash from the subset is detected by the central office trunk circuit which places a LOW signal on conductor AQR to the common control circuit 300 FIG. 3. The receipt of the LOW signal on conductor AQR, inverted by gate 323, in conjunction with a HIGH signal on conductor IAQ from the idler circuit scanner 400 FIG. 4 indicating that an idle attendant queue number store is available turns ON gate 301 of the common control circuit FIG. 3. Gate 301 turning ON generates a LOW signal, inverted by gate 302, generating a HIGH signal on conductor AQRM to the mode control circuit 303 FIG. 3 of the common control circuit. The receipt of the signal on conductor AQRM causes section B of the mode control circuit to enter what is called the "attendant queue read-in mode" in which the circuit requesting connection to the attendant has its identity stored in the attendant queue, preparatory to connection to the attendant via an attendant position circuit.

Section B of the mode control circuit, in response to the HIGH signal on conductor AQRM, places a HIGH signal on conductor AQRR to the attendant queue read-in mode circuit 304 FIG. 3. Section B of the attendant queue read-in circuit responds to the signal on lead AQRR by placing a HIGH signal on conductor SCAN which, in conjunction with the previously mentioned HIGH signal on conductor AQRR, activates the service request scanner 401 ON FIG. 4. To locate the circuit requesting connection to the attendant, the service request scanner sequentially places a HIGH signal on conductors T0 through T9 which are code leads 211 to the trunk circuits. When the requesting trunk circuit, in this case central office trunk circuit 0, is enabled by the HIGH signal on its associated code lead, in this case conductor T0, it responds by placing a LOW signal on conductor STS which is one of the code leads 211 to the service request scanner. The LOW signal placed on conductor STS by the trunk circuit indicates to the service request scanner that the trunk circuit requesting service has been located, and the service request scanner stops scanning.

Data Storage in the Queue

The service request scanner responds to this LOW signal on conductor STS by placing a HIGH signal on conductor SS to the attendant queue read-in circuit 304 on FIG. 3. The attendant queue read-in circuit responds to this signal by advancing to section C and placing a HIGH signal on conductor AQRE which is one of the signal leads 305 to the attendant queue circuit 500. The control portion 501 of the attendant queue circuit responds to the HIGH signal on conductor AQRE by scanning the control leads 502-0 through 502-15 to determine which of the attendant queue number stores 503-0 through 503-15 are idle.

The control portion of the attendant queue circuit selects the first idle attendant queue number store that is located by placing a HIGH signal on the selection lead which is one of the control leads 502 associated with this number store. Let it be assumed that this idle number store is the first attendant queue number store (number store 0) 503-0. The control portion of the attendant queue circuit selects number store 0 and indicates that an idler attendant queue number store has been selected by placing a HIGH signal on conductor AQE which is one of the signal leads 305 to the common control circuit.

The attendant queue read-in circuit 304 of the common control circuit responds to the HIGH signal on conductor AQE by advancing to section D and by placing a HIGH signal on conductor AQRI to the service request scanner 401 and the attendant queue circuit 500. The HIGH signal on conductor AQRI causes the service request scanner to read out its contents, the identity of the trunk circuit requesting connection to the attendant, onto data bus leads UN1 through TN8 which are the conductors 412 to the attendant queue circuit. The HIGH signal on conductor AQRI also causes the control portion of the attendant queue circuit to signal the steering portion of the attendant queue circuit on signal leads 508. The steering portion of the attendant queue circuit enables the input gating circuit 504-0 associated with number store 503-0 by placing a HIGH signal on conductor 505-0, thus reading in the data from the data bus lead UN1 through TN8 into attendant queue number store 0. The attendant queue read-in circuit of the common control circuit automatically advances to section E and places a HIGH signal on conductor REQS which is one of the signal leads 210 to the trunk circuits. The HIGH signal on conductor REQS causes the selected trunk circuit requesting connection to the attendant to remove its LOW signal from conductor AQR, thus removing its request for connection to the attendant. The attendant queue read-in circuit automatically advances to section F and places a HIGH signal on conductor RAQR which turns ON gate 306 FIG. 2B. Gate 306 turning ON turns OFF gate 307 placing a HIGH signal on conductor RESET which resets the mode control portion 303 of the common control circuit.

Call Completion - Activation of Readout Circuitry

The present status of the call is that the identity of the trunk circuit requesting connection to the attendant is stored in the attendant queue number store 0. The trunk circuit has removed its request for connection to the attendant and control of this request for service is now in the attendant queue circuit and no action will be taken until an attendant position circuit becomes available.

Let it be assumed that an attendant position circuit now becomes idle. Let it further be assumed that this idle attendant position circuit is attendant position circuit 0. The idle attendant position circuit, 202, places a LOW signal on conductor AP which is one of the signal leads 211 to the idle circuit scanner of the common control circuit. The signal on lead AP indicates that an idle attendant position circuit is available. The idle circuit scanner responds to the LOW signal on conductor AP by placing a HIGH signal on conductor IAP to gate 308 of the common control circuit indicating that there exists an idle attendant position.

The existence of data in one or more of the attendant queue number stores causes the control portion 501 of the attendant queue circuit to place a HIGH signal on conductor SLC which is one of the signal leads 305 to the common control circuit. The HIGH signal on conductor SLC in conjunction with the previously mentioned HIGH signal on conductor IAP turns ON gate 308 of the common control circuit, placing a LOW signal on conductor SLM. The LOW signal on conductor SLM turns OFF gate 309 of the common control circuit placing a HIGH signal on conductor SLCM to the mode control circuit 303.

Call Completion - Data Readout of Queue

The HIGH signal on conductor SLCM causes section C of the mode control circuit to enter what is known as the "attendant position connect mode". Section C of the mode control circuit places a HIGH signal on conductor SLCR which activates the attendant position connect circuit 310 of the common control circuit. Section B of the attendant position connect circuit places a HIGH signal on conductor ROAQ to the attendant queue circuit 500 and to the service request scanner 401. The HIGH signal on conductor ROAQ activates the control portion 501 of the attendant queue circuit which signals the steering portion 506 of the attendant queue circuit to place a HIGH signal on conductor 507-0.

The HIGH signal on conductor 507-0 enables the output gating circuitry 507-0 associated with attendant queue number store 0. The control portion of the attendant queue circuit places a HIGH signal on one of the conductors 502-0 causing attendant queue number store 0 to read out its contents through the gating circuit 504-0 onto the data bus leads UN1 through TN8. The service request scanner 401 has also been enabled by the HIGH signal on conductor ROAQ and it receives and stores the data placed on data bus leads UN1 through TN8.

The indication of the completion of the data transfer is transmitted to the control portion of the attendant queue circuit by way of conductors 502-0 from the attendant queue number store 0. The control portion of the attendant queue circuit responds to this signal by placing a HIGH signal on conductor ROUT to the attendant position connect circuit of the common control circuit which responds by advancing to section C and by placing a HIGH signal on conductor SEL. The idle circuit scanner 400 responds to the HIGH signal on conductor SEL in conjunction with the previously mentioned LOW signal on conductor SLCR by sequentially scanning all attendant position circuits to locate an idle one.

This is accomplished by the idle circuit scanner sequentially placing a HIGH signal on conductors SL0 through SLN until an idle attendant position circuit has been located. In this case the idle attendant position circuit is circuit 0 so when the idle circuit scanner places a HIGH signal on conductor SL0 the attendant position circuit 0 responds by placing a LOW signal on conductor SSLS which stops the idle circuit scanner. The idle circuit scanner responds to the LOW signal on conductor SSLS by placing a HIGH signal on conductor SICS to the attendant position connect circuit. The attendant position connect circuit advances to section D and places a HIGH signal on conductor CBE which enables the callback subsequence circuit 311 of the common control circuit.

The callback subsequence circuit now initiates a callback operation to determine the identity of the line circuit connected to the central office trunk circuit involved in this call. This is done by section B of the callback subsequence circuit placing a HIGH signal on conductor TCB to the callback control circuit 402 FIG. 4. The callback control circuit responds to this signal on lead TCB by placing a HIGH signal on conductor TCBE which is one of the signal leads 210 to the trunk circuits. The HIGH signal on conductor TCBE causes the selected central office trunk circuit, in this case, central office trunk 0 to place a LOW signal on its conductor S. The LOW signal on the conductor S of the central office trunk circuit is carried through the switching network to the line circuit that is connected to the central office trunk circuit on this call. The callback subsequence circuit automatically advances to section C and places a HIGH signal on conductor LCB to the callback control circuit. This signal causes the callback control circuit to place a HIGH signal on conductor LCBE which is one of the signal leads 215 to the line circuits. The callback subsequence circuit automatically advances to section D and places a HIGH signal on conductor LSCN.

The signal on lead LSCN activates the line scanner 403 which now begins scanning to locate the called back line circuit. The line scanner varies the signals on its output leads ST1 through SU8 and these signals are passed through the gating circuit 404 to the line selector 405. The varying outputs of the line scanner cause the line selector to sequentially select each line circuit by placing unique combinations of signals on output leads of the line selector U0 to T0 through U9 and T9. The outputs of the line selector comprise code leads 219 to the line circuits. In this case the called back line circuit is line circuit LC00 and when the line selector places a HIGH signal on the combination of code leads U0 and T0, line circuit LC00 will be selected. The HIGH signal on conductors U0 and T0 cause gate 203 of LC00 to turn ON, thus turning OFF gate 204. The HIGH signal due to the output of gate 204 in conjunction with the HIGH signal on conductor LCBE and the HIGH signal on the output of gate 27 due to the LOW signal on conductor S of line circuit LC00 causes gate 205 to turn ON placing a LOW signal on conductor SLS.

The LOW signal on conductor SLS, one of the signal leads 219 to the line scanner, causes the line scanner to stop scanning. The line scanner then places a HIGH signal on conductor SLSR indicating that the called back line circuit has been located. The HIGH signal on conductor SLSR causes the callback subsequence circuit to advance to section E and places a HIGH signal on conductor CBR which signals the attendant position connect circuit that the callback operation is completed. The attendant position connects circuit responds by advancing to section E and by placing a HIGH signal on conductor LM which is one of the signal leads 215 to the line circuits. The HIGH signal on conductor LM, doubly inverted by gates 314 and 315, in conjunction with the selection of line circuit LC00 cause gate 209 of line circuit LC00 to turn ON, placing a LOW signal on conductor M of line circuit LC00, thus marking the line circuit line side network appearance. The attendant position connect circuit automatically advances to section F and places a HIGH signal on conductor SLTM which is one of the signal leads 210 to the attendant position circuit. The HIGH signal on conductor SLTM, doubly inverted by gates 316 and 317, the selected attendant position circuit, in this case circuit 0, to place a LOW signal on the conductor M associated with the trunk side network appearance of this circuit.

Call Completion - Connection to the Attendant Position Circuit

The incidence of a marked network appearance on both the line side and the trunk side of the switching network activates the network control circuit 201 ON FIG. 2. The network control circuit determines that a path exists between the two marked network appearances and places a HIGH signal on conductor PA to the attendant position connect circuit indicating that a path exists between the two marked network appearances. The attendant position connect circuit responds by advancing to section G and by placing a HIGH signal on conductor STD which is one of the signal leads 210 to the trunk circuits. The HIGH signal on conductor STD causes the selected trunk circuit, in this case central office trunk circuit 0, to release the network connection that exists between this central office truck circuit and line circuit LC00. The attendant position connect circuit responds by automatically advancing to section H and by placing a HIGH signal, doubly inverted by gates 318 and 321, on conductor PATH to the network control circuit, causing the network control circuit to establish a network path between the two marked network appearances, that is, line circuit LC00 and the trunk side network appearance of the attendant position circuit 0.

When this path is completed, the network control circuit responds by placing a HIGH signal on conductor PC to the attendant position connect circuit indicating that the path is complete. The attendant position connect circuit responds by advancing to section I and by placing a HIGH signal on conductor TM which is one of the signal leads 210 to the trunk circuits. The HIGH signal on lead TM is inverted by gate 319 and turns OFF gates 314, 316, and 318. These gates turning OFF remove the signals from leads LM, SLTM, and PATH, thus causing the selected trunk and live circuit to remove the marks from their network appearances. The HIGH signal on conductor TM causes the selected central office trunk circuit to mark its trunk side network appearance by placing a LOW signal on its conductor M. The attendant position connect circuit automatically advances to section J and places a HIGH signal on conductor SLLM which is one of the signal leads 210 to the attendant position circuit. The HIGH signal on conductor SLLM causes the selected attendant position circuit to mark its line side network appearance by placing a LOW signal on the conductor M associated with that appearance.

Once again, the network control circuit is activated by the incidence of a market network appearance on the trunk side and the line side. The network control circuit determines that a path exists between these two marked network appearances and places a HIGH signal on conductor PA to the attendant position connect circuit indicating a path is available. The attendant position connect circuit responds by advancing to section K and by placing a HIGH signal, doubly inverted by gates 320 and 321, on conductor PATH to the network control circuit causing the network control circuit to establish a network path between the two marked network appearances. Once this path is completed, the network control circuit responds by placing a HIGH signal on conductor PC indicating to the attendant position connect circuit that the path is complete. The attendant position connect circuit responds by advancing to section L and by placing a HIGH signal on conductor RSLC which resets the attendant position connect circuit and turns ON gate 314 of the common control circuit, thus turning OFF gate 307 of the common control circuit. Gate 307 turning OFF places a HIGH signal on conductor RESET which resets the mode control circuit portion 303 of the common control. The HIGH signal on conductor RSLC is also transmitted by way of signal leads 305 to the attendant queue circuit.

The present status of this call is that a line circuit is connected by the switching network to the trunk side network appearance of the attendant position circuit and the central office trunk circuit is connected by the network to the line side network appearance of the attendant position circuit. Thus both the station party and the central office party may speak to the attendant. What remains is to update the data that is stored on the attendant queue circuit.

This updating of the queue is accomplished by the HIGH signal on conductor RSLC to the attendant queue circuit. The HIGH signal on conductor RSLC causes the control portion 501 of the attendant queue circuit to place signals on conductors 502-0 through 502-15 to all the attendant queue number stores. These signals cause the contents of each attendant queue number store to be read out to the next number store. That is, the contents of attendant queue number store 1 are read into attendant queue number store 0, the contents of attendant queue number store 2 are read into attendant queue number store 1, etc. Thus, the data in the queue is is shifted forward so that the identity of the call waiting the longest is now placed in attendant queue number store 0. The processing of the call under consideration is completed, the queue is updated, and all circuits are returned to their normal states and another call may be processed by the system.

Conclusion

While a specific embodiment of the invention has been disclosed, variations in procedural and structural detail within the scope of the appended claims are possible, and are contemplated. There is no intention of limitation to what is contained in the abstract or the exact disclosure as herein presented. The above-described arrangements are only illustrative of the application of the principles of the invention. Numerous other arrangements may be devised by those skilled in the art without departing from the spirit and scope of the invention.

What is claimed is:

1. In a telephone switching system, a first-in first-out attendant queue circuit, an attendant position circuit, a plurality of trunk circuits, an attendant queue arrangement comprising:
    means for detecting requests by said trunk circuits for connection to said attendant position circuit;
    means for determining the circuit identity of any said detected requesting trunk circuit;
    means for storing any said determined circuit identity in said first-in first-out attendant queue circuit;
    means for detecting when said attendant position circuit is idle;
    means controlled by said idle detection means for retrieving a next available circuit identity from said attendant queue circuit; and
    means responsive to a retrieved circuit identity for connecting said trunk circuit associated with said retrieved circuit identity to said idle attendant position circuit.

2. The invention recited in claim 1 additionally comprising:
    trunk scanning means for receiving and storing said retrieved circuit identity; and
    means for selecting said trunk circuit associated with said retrieved circuit identity, said selecting means being activated by said trunk scanning means.

3. The invention recited in claim 1 further comprising means for expunging said circuit identity from said attendant queue circuit, said expunging means being activated by said connecting means.

4. The invention recited in claim 1 wherein said request detecting means is additionally responsive to means for detecting an attendant recall on an existing call.

5. The invention recited in claim 1 wherein said detecting means is additionally responsive to means for detecting an incoming central office call to said attendant position circuit.

6. The invention recited in claim 1 wherein said detecting means is additionally responsive to means for detecting a station originated attendant-directed call.

7. In a telephone switching system, an attendant position circuit, a plurality of trunk circuits, means for detecting requests by said trunk circuits for connection of said trunk circuits to said attendant position circuit;

means for determining the circuit identity of any said trunk circuit requesting connection to said attendant position circuit, said determining means being activated by said detecting means;

means for detecting when said attendant position circuit is idle;

a first-in first-out attendant queue circuit comprising:

a plurality of means for storing circuit identities, means for selecting one of said storing means, said selecting means responsive to said determining means, means for reading into said selected storing means said determined circuit identity, said reading into means responsive to said selecting means, means for reading out of the next available said storing means said determined circuit identity, said reading out means being activated by said idle determining means, trunk scanning means for storing said read-out circuit identity;

means for selecting said trunk circuit associated with said stored circuit identity, said selecting means being activated by said trunk scanning means; and means responsive to a trunk circuit selection for connecting said selected trunk circuit to said idle attendant position circuit.

8. The invention recited in claim 7 wherein said plurality of storage means comprises an ordered sequence of storage means.

9. The invention recited in claim 8 wherein said determined circuit identity is stored in said ordered sequence of storage means in the order of arrival by said reading in means.

10. The invention recited in claim 7 wherein said reading out means comprises a nondestructive read-out circuit.

11. The invention recited in claim 10 additionally comprising means for expunging said determined circuit identity from said next available said storage means.

12. The invention recited in claim 11 additionally comprising means for shifting said determined circuit identity from one of said plurality of storage means to the next one of said plurality of storage means in said ordered sequence.

13. The invention recited in claim 12 wherein said shifting means are responsive to said connecting means for shifting said determined circuit identities from each of said plurality of storage means to the next ones of said plurality of storage means in said ordered sequence, such that the order of arrival sequence is preserved and the longest stored said determined circuit identity is stored in the first of said ordered sequence of said plurality of storage means.

14. The invention recited in claim 7 wherein said detecting means is responsive to means for detecting an attendant recall on an existing call.

15. The invention recited in claim 7 wherein said detecting means is additionally responsive to means for detecting an incoming central office call to said attendant position circuit.

16. The invention recited in claim 7 wherein detecting means is additionally responsive to means for detecting station originated attendant-directed calls.

* * * * *